US009619715B2

(12) United States Patent
Fan et al.

(10) Patent No.: US 9,619,715 B2
(45) Date of Patent: *Apr. 11, 2017

(54) ATTRIBUTE-BASED ALERT RANKING FOR ALERT ADJUDICATION

(71) Applicant: INTERNATIONAL BUSINESS MACHINES CORPORATION, Armonk, NY (US)

(72) Inventors: Quanfu Fan, Somerville, MA (US); Sharathchandra U. Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/059,905

(22) Filed: Mar. 3, 2016

(65) Prior Publication Data

US 2016/0188982 A1    Jun. 30, 2016

Related U.S. Application Data

(63) Continuation of application No. 14/948,458, filed on Nov. 23, 2015, now Pat. No. 9,330,314, which is a
(Continued)

(51) Int. Cl.
*G06K 9/00*    (2006.01)
*G06K 9/32*    (2006.01)
(Continued)

(52) U.S. Cl.
CPC ..... *G06K 9/00744* (2013.01); *G06K 9/00718* (2013.01); *G06K 9/00771* (2013.01);
(Continued)

(58) Field of Classification Search
CPC .......... G06K 9/00744; G06K 9/00771; G06K 9/3241; G06K 9/66
See application file for complete search history.

(56) References Cited

U.S. PATENT DOCUMENTS 7,418,134 B2    8/2008    Schwartz et al.
7,463,147 B1    12/2008    Laffoon
(Continued)

OTHER PUBLICATIONS

Thorsten Joachims, Optimizing Search Engines using Clickthrough Data, Cornell University, Department of Computer Science, Ithaca, NY, 2002, 10 pp.
(Continued)

*Primary Examiner* — Tom Y Lu
(74) *Attorney, Agent, or Firm* — Patrick J. Daugherty; Driggs, Hogg, Daugherty & Del Zoppo Co., LPA

(57) ABSTRACT

Alerts to object behaviors are prioritized for adjudication as a function of relative values of abandonment, foregroundness and staticness attributes. The attributes are determined from feature data extracted from video frame image data. The abandonment attribute indicates a level of likelihood of abandonment of an object. The foregroundness attribute quantifies a level of separation of foreground image data of the object from a background model of the image scene. The staticness attribute quantifies a level of stability of dimensions of a bounding box of the object over time. Alerts are also prioritized according to an importance or relevance value that is learned and generated from the relative abandonment, foregroundness and staticness attribute strengths.

20 Claims, 3 Drawing Sheets

Related U.S. Application Data continuation of application No. 14/661,071, filed on Mar. 18, 2015, now Pat. No. 9,230,174, which is a continuation of application No. 13/755,023, filed on Jan. 31, 2013, now Pat. No. 9,020,190.

(51) Int. Cl.
    *G06K 9/66*      (2006.01)
    *G06K 9/62*      (2006.01)
    *G06T 7/20*      (2017.01)

(52) U.S. Cl.
    CPC ......... *G06K 9/3241* (2013.01); *G06K 9/6277* (2013.01); *G06K 9/66* (2013.01); *G06T 7/204* (2013.01); *G06T 7/2033* (2013.01); *G06T 2207/10016* (2013.01); *G06T 2207/30232* (2013.01)

(56) References Cited

U.S. PATENT DOCUMENTS

| | | |
|---|---|---|
| 7,526,102 B2 | 4/2009 | Ozer |
| 7,860,344 B1 | 12/2010 | Fitzpatrick et al. |
| 7,916,944 B2 | 3/2011 | Yang et al. |
| 7,925,077 B2 | 4/2011 | Woodfill et al. |
| 8,374,388 B2 | 2/2013 | Stolkin et al. |
| 8,597,027 B2 | 12/2013 | Staplin |
| 9,230,174 B2 * | 1/2016 | Fan .................. G06K 9/3241 |
| 2004/0151342 A1 | 8/2004 | Venetianer et al. |
| 2005/0036658 A1 | 2/2005 | Gibbins et al. |
| 2008/0247599 A1 | 10/2008 | Porikili et al. |
| 2009/0110236 A1 | 4/2009 | Huang et al. |
| 2009/0244390 A1 | 10/2009 | Feris et al. |
| 2010/0185411 A1 * | 7/2010 | Pfeiffer .................. G08G 1/01 702/150 |
| 2012/0027248 A1 | 2/2012 | Feris et al. |

OTHER PUBLICATIONS

Devi Parikh et al, Relative Attributes, Proceedings of the IEEE International Conference on Computer Vision (ICCV), 2011, 8 pp.
U.S. Appl. No. 14/948,458, filed Nov. 23, 2015.
Notice of Allowance (Mail Date Feb. 4, 2016) for U.S. Appl. No. 14/948,458, filed Nov. 23, 2015.

* cited by examiner

| Alerts | Staticness | Foregroundness | Abandonment |
|---|---|---|---|
| $B^+$ | High | High | High |
| $P^-$ | Low | High | Medium |
| $L^-$ | High | Low | Low |
| $S^-$ | High | Medium | Low |
| $G^-$ | High | Low | Low |
| Relative Order | $B^+ > P^-$ $L^-, S^-, G^- > P^-$ | $B^+ > S^-, L^-, G^-$ $P^- > S^-, L^-, G^-$ | $B^+ > P^-$ $P^- > S^-, L^-, G^-$ |

ATTRIBUTE-BASED ALERT RANKING FOR ALERT ADJUDICATION

FIELD OF THE INVENTION

The present invention relates to image analytics technology. More specifically, the present invention relates to the automated analysis of image data to determine and recognize object activity.

BACKGROUND

Automated systems may use video analytics to process video data to determine object movements and other events of concern. Such systems may use background subtraction (BGS) mask processes to distinguish object items as foreground features in the video data, objects that are distinct from a background model of the image data and discernible within video imagery. The primary goal of automated video surveillance is generally to detect and raise alerts for abnormal or other events that fit defined descriptions of concern. When determined object conditions or behaviors are met, alerts are issued to human monitors for adjudication. Examples of alert triggers include detecting a bag object remaining unmoving for a specified period of time in the case of possible abandoned objects, an automobile-sized object stationary and across railway tracks in a railway crossing scene, a person object located outside of a safety barrier, and still others will be apparent to one skilled in the art. The object alerts are typically issued to human monitors to manually review the video data or physically respond to a scene itself to inspect the object in order to decide whether the alarm is true, or that it is false and that no object behavior of concern is actually indicated by the foreground features.

Though effective in determining object behaviors meeting thresholds for raising user-specified concerns, large-scale deployments of computer-vision based systems typically generate such a large number of false alarms thought automated processes that human verification of each alarm may be impractical. For example, a system that processes video data input and yields an average of four alerts per day per camera will produce a total of 4,000 alerts per day from 1,000 cameras. Assuming that each alert may be verified in an average time of two minutes indicates that 66.67 man-power hours will be required to adjudicate an average number of alerts generated in a 24-hour day: this is equivalent to the workload of a team of more than eight full-time employees. Accordingly, human adjudication costs may be prohibitive and indicate against deploying automated video surveillance systems having large numbers of cameras.

BRIEF SUMMARY

In one aspect of the present invention, a method automatically prioritizes the adjudication of object alerts as a function of relative visual attribute values. In response to detecting an object that is discernible and static within an image scene of a video data input, a processing unit generates an alert, tracks the detected object and extracts image features from the video data input. Relative strengths of abandonment, foregroundness and staticness attributes are learned and ranked from the extracted features. The abandonment attribute indicates a level of likelihood of abandonment of the object. The foregroundness attribute quantifies a level of separation of foreground image data of the object from a background model of the image scene. The staticness attribute quantifies a level of stability of dimensions of a bounding box of the object over time. Alerts are prioritized relative to other alerts according to an importance or relevance value that is learned and generated from the relative abandonment, foregroundness and staticness attribute strengths.

In another aspect a system automatically prioritizes the adjudication of object alerts as a function of relative visual attribute values. In response to detecting an object that is discernible and static within an image scene of a video data input, a processing unit generates an alert, tracks the detected object and extracts image features from the video data input. Relative strengths of abandonment, foregroundness and staticness attributes are learned and ranked from the extracted features. The abandonment attribute indicates a level of likelihood of abandonment of the object. The foregroundness attribute quantifies a level of separation of foreground image data of the object from a background model of the image scene. The staticness attribute quantifies a level of stability of dimensions of a bounding box of the object over time. Alerts are prioritized relative to other alerts according to an importance or relevance value that is learned and generated from the relative abandonment, foregroundness and staticness attribute strengths.

In another aspect, a computer program product has a tangible computer-readable storage medium with computer readable program code embodied therewith, the computer readable program code including instructions that, when executed by a computer processing unit, cause the computer processing unit to automatically prioritize the adjudication of object alerts as a function of relative visual attribute values. In response to detecting an object that is discernible and static within an image scene of a video data input, an alert is generated and the detected object tracked and image features extracted from the video data input. Relative strengths of abandonment, foregroundness and staticness attributes are learned and ranked from the extracted features. The abandonment attribute indicates a level of likelihood of abandonment of the object. The foregroundness attribute quantifies a level of separation of foreground image data of the object from a background model of the image scene. The staticness attribute quantifies a level of stability of dimensions of a bounding box of the object over time. Alerts are prioritized relative to other alerts according to an importance or relevance value that is learned and generated from the relative abandonment, foregroundness and staticness attribute strengths.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figures 1, 2:
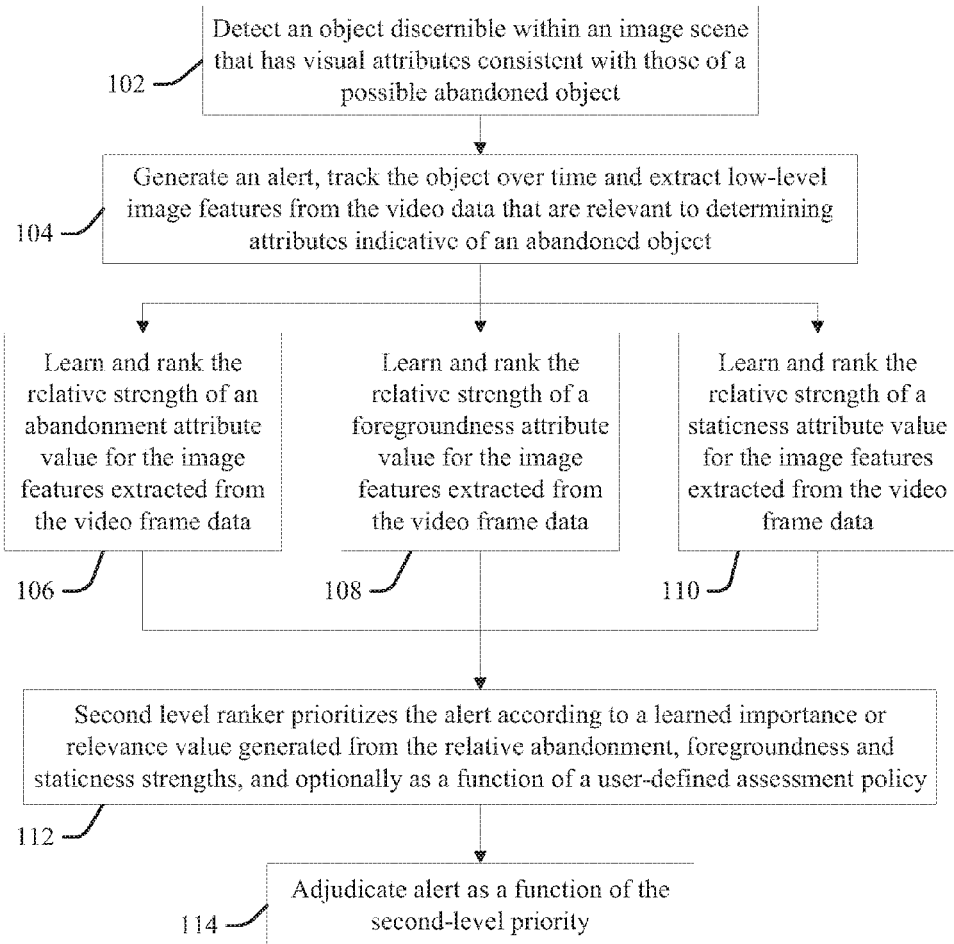
FIG. 1 is a block diagram illustration of a method or process for prioritizing abandoned object detection alerts as a function of relative visual attribute values according to the present invention.
FIG. 2 is a tabular illustration of relationships according to the present invention for labeling or ranking objects found in video scene data as a function of the relative strength of values determined for different feature attributes.

The drawings are not necessarily to scale. The drawings are merely schematic representations, not intended to portray specific parameters of the invention. The drawings are intended to depict only typical aspects, examples and embodiments of the invention, and therefore should not be considered as limiting the scope of the invention. In the drawings, like numbering represents like elements.

DETAILED DESCRIPTION

Effective deployment of video surveillance systems with low false alarm rates is challenging due to a variety of technical challenges presented by real-world scenarios (for example, quick lighting changes, object tracking challenges and occlusions caused by variable and dynamically changing large crowd sizes, low-resolution imaging inputs, etc.). With regard to surveillance for abandoned objects such as bags and suitcases in public assembly areas, the visual attributes of people distinguished within the scene data may fit defined alarm profiles and result in as many as 50% of false positives, in a context where intentionally abandoned object items that are true positives ("true drops") occur rarely (for example, one or two percent of all alarms). As the risk of loss from missing a true drop may be very high, in order to provide acceptable hit rates while at the same time working at low frame rates, an automated system may have to maintain a high sensitivity and thereby increase the rate of false positives. However, high false positive rates may be prohibitive from an adjudication cost standpoint for a surveillance system with large numbers of cameras (hundreds or thousands), preventing the system from performing at a scale commensurate with the computational capacities of its resources, and limiting the use of some sophisticated approaches for video analysis.

Meaningful automated analysis of extracted low-level region features that is dispositive of determining whether an object within the video data meets concern criteria is challenging, for example to determine if an object is static and abandoned, or instead not static, not abandoned or not even an inanimate object but instead a person, animal, etc. The prior art generally makes such determinations as a function of applying ground truths to the visual features of objects. Such ground truths are determined through comparing similarities to (for example, a distance from) certain features determined from labeled training images in a learned classification approach. However, such learned classification approaches are not very effective in reducing false positive alerts, since the variation in extracted features between true and false positive events may not be very great or at least dispositive. False alarms tend to be generated by such learned classification approaches at unacceptable high rates because a lot of different objects and events may be confused with objects truly matching the target profiles. For example, people, lighting changes and shadows are frequently detected as static objects by video analytic algorithms, in some examples due to image conditions that impact the quality of the extracted features such as cluttered backgrounds, temporary occlusions, small sizes of objects of interest, et cetera.

Some prior art systems address this problem through mechanisms that attempt to identify and cull false positive events and thereby reduce demands on human monitors or to otherwise improve the performance of the systems. However, reducing the numbers of false positives often impacts and increases the numbers of miss-reported false negatives or true events. In some applications, each and every true abandoned object event should be identified, and the system should not miss any true abandoned events, which is not the case if pro-active culling of suspected false positives also eliminates even one true event. In contrast, aspects of the present invention transform extracted, low-level features into a plurality of different, high-level attribute ranking or relative strength values that are measurable or otherwise quantitatively assigned and relevant to ground truth observations of true and/or false events.

FIG. 1 illustrates an aspect of a process or system according to the present invention that prioritizes the adjudication of object alerts as a function of relative visual attribute values. For illustration purposes, examples configured to detect abandoned objects will be described in detail. However, one skilled in the art will appreciate and understand the application of the aspects described to other video analysis implementations, such as railway crossing surveillance, safety barrier monitoring, exit and ingress door access and egress in secured facilities, etc.

At 102 a video analytic system or process detects an object discernible within an image scene of a video input that has visual attributes consistent with those of a possible abandoned object. At 104 the system generates an alert, tracks the object over time and extracts low-level image features from the video data that are relevant to determining each of a plurality of attributes that are indicative of an abandoned object. In the present example, the video analytic system is a BGS system, wherein the possible abandoned object is detected as a foreground object within an image scene that is distinct from a background model and static or otherwise unmoving as defined by constraints and parameters of the BGS system for a threshold period of time. However, it will be understood that possible abandoned object determinations may be made by other aspects through a variety of processes, including motion feature or color feature extraction and analysis, thermal profile and audio analysis, etc., and examples of the present invention are not limited to BGS system domains or the specific examples provided herein for illustration.

In one aspect, at 104 a BGS system utilizes a Gaussian mixture model (MoG) variant with a finite state machine (FSM) to keep track of temporally static objects such as baggage, packages, stopped cars or still pedestrians. In the prior art, an object may be introduced into an FSM after it remains static for a specified time period, and prior to this point no information is known or determined about the object. In contrast, aspects of the present invention use an efficient mini-tracker at 104 that extracts low-level feature data from video data from an initial timeframe encompassing behavior at an initial time of appearance of the object in the video data, and continues to extract data over a tracklet for the object that tracks the visual attributes over time.

The features extracted at 104 may include bounding box dimensions and change data, wherein bounding boxes define object blobs detected and identified as possible abandoned objects, and/or those of other foreground objects distinct from the possible abandoned object. Optical flow features may also be extracted, including motion flow, motion change, and other visual data that is variable over time and associated with movement or non-movement (static, unchanged object positioning over time) of a foreground object blob within its bounding box dimensions. Border contrast features may also be extracted from the bounding box data, features that are relevant to distinctiveness of the object blob such as sharpness, definition, granularity or other visual image sharpness and definition attributes that are relevant to visually defining and distinguishing the foreground blob relative to the background model image data. Still other image features apparent to one skilled in the art may be extracted.

The mini-tracker and the FSM provide rich information about the history of the object triggering the alert. Based on this information, a plurality of different visual attribute values that are indicative of an abandoned object are each learned from the extracted feature data and relatively ranked by a plurality of different respective attribute rankers. More particularly, in the present example, the relative strength or rank of a staticness attribute value is learned and ranked at 110, the relative strength or rank of a foregroundness attribute value is learned and ranked at 108, and the relative strength or rank of an abandonment attribute value is learned and ranked at 106.

In general, abandoned objects are essentially foreground objects that remain motionless over a certain period of time in the scene. They indicate much higher staticness when compared to temporally static people, as people often exhibit slight movements, such as internal motion perceptible within their location in the scene. Truly abandoned objects are also more dissimilar to background than spurious foreground objects such as lighting artifacts and shadows, i.e. present generally present higher foregroundness attribute qualities or levels. One more attribute that abandoned objects possess uniquely is abandonment, i.e. some human activity or behavior around the objects just as they are dropped and left in isolation. Aspects of the present invention use these observations to define and train the respective rankers applied at 106, 108 and 110 to determine the relative strength of these attributes for images associated with the alert at 102.

Table 1 illustrated in FIG. 2 describes relative strengths of the values of each of these abandonment, foregroundness and staticness attributes learned with respect to each of a plurality of different kinds of objects in the video data that may trigger or otherwise be associated with abandoned object alerts at 102. The ordering and similarity labels of Table 1 are derived from hypotheses and learned from processing training image video data and observing clustering of the attribute values associated with each of the labeled objects in the training video. In this example, abandoned bags (B) may be truly abandoned objects. Each of the other items that may be detected by video analytic systems as possible abandoned objects, namely people (P), lighting change artifacts (L), shadow artifacts (S) and ghost artifacts (G), are in fact not abandoned objects at all, and hence "abandoned object" alarms associated with these "objects" are false. The superscripts associated with each of these object labels denotes whether or not the object may be a truly abandoned object, with the "+" applied to the bag (B) denoting that this object may be a truly abandoned object, the "−" applied to each of the other object labels denoting that they are not abandoned objects.

The bottom row of Table 1 shows the relative orderings of the different objects with respect to the relative strengths of the foregroundness, abandonment and staticness attributes of the corresponding columns that have been learned or specified, wherein "A>B" implies a one of the labels A exhibits a higher degree or strength of a particular attribute than another of the labels B, while "A,B" implies that respective labels A and B possess a similar degree of that attribute. The label assignments and relative orderings of Table 1 reflect that a truly abandoned object such as a piece of luggage (B) should remain static in a video scene for a long time, therefore have a high staticness value ranking at 110; that it is very different from the background and should therefore have a high foregroundness value ranking at 108; and that it should have been observed as previously in the possession of an owner at the commencement of its static behavior, which should generate a high abandonment value ranking at 106.

In contrast, an object associated with a false alarm is not expected to exhibit high degrees of all of these three attributes. For instance, a person (P) is highly distinctive from the background and may be expected to have a high foregroundness ranking value, but usually has a small amount of associated motion and thereby should exhibit a lower staticness value ranking relative to a bag (B) or other truly abandoned object. This reflects that a person sitting for a minimum time period may be motionless enough to meet a minimum static threshold and thereby trigger an abandoned object alert at 102, but that such a sitting person is usually not completely still but will make slight, perceptible movements that perturb the dimensions of their associated bounding box and cause it to change in some small or minimum amount over time, just enough to destabilize the bounding box defining the person object within the image data. This is in contrast to the bounding box of a truly static object, which should not change much or at all but remain stable if truly abandoned. Furthermore, a person (P) can be part of a group initially in a scene, and then later isolated and still, thereby exhibiting abandonment somewhere between a bag and a static background (medium abandonment). Similarly, other objects that are associated with false alarms such as lighting changes (L), shadows (S) and ghosts (G) should exhibit the different relative ranking values or degrees of the attributes as indicated by the pair-wise relationships illustrated in Table 1.

The relationship observations of Table 1 reflect that in general, abandoned objects are essentially foreground objects that remain motionless over a certain period of time in the scene. While people may also hold still, they often exhibit slight movements, for example, internal motion generally about and substantially within the confines of their bounding box. Accordingly, the relationships and associated attribute value of Table 1 are used to generate the different relative attribute ranking values at 106, 108, and 110, assigning higher normalized values to attribute observations that correlate to observations expected to be found in video data from truly abandoned objects. In one aspect, true drop objects should have higher qualities of staticness attributes determined at 110 relative to people or objects. True drops are also generally more dissimilar to BGS background models than other highly-static (unmoving) visual artifacts such as spurious foreground objects (ghosts), lighting artifacts and shadows, and thus they should have a higher level of distinctive definition within the video data, i.e. a higher quality of foregroundness determined at 108 relative to visual artifacts.

Abandoned objects uniquely possess a quality of abandonment determined at 106 defined by some associated human activity or behavior around the objects just as they are dropped and left in isolation. A quality of abandonment is an element unique to true abandoned objects. For example, with respect to a static bag distinguished within image data, for the bag to be characterized as an abandoned bag an assumption may be made that the bag should have been left behind by a person, an attribute that is not shared by other true foreground static objects such as trees, benches or other fixtures. Accordingly, video frame data extracted by the tracker at 104 should indicate an association with an owner or other person carrying or otherwise transporting the bag prior to commencing its static state, for example via showing an owner in a common bounding box area with a static item during a last motion of the item prior to it becoming static.

Abandonment is a high-level semantic attribute. While it may be difficult to accurately associate each bag with a proper owner, there should be some type or quality of ownership attribute determined with respect to an abandoned bag and a person, and the process at 106 quantifies the strength of this association by assigning an abandonment or likelihood strength or ranking value. For example, right before a bag is detached from a person leaving it behind, a large quantity of motion should generally be observed in an immediate area of the bag by the tracker at 104, and this motion may be determined by finding the difference between motion activity before and after commencement of a period of static motion values associated with the possible abandoned object. Further, the motion should also be associated with an amount of a change in the size of a bounding box associated with the static object relative to the commencement of its static nature: if the foreground object is merely a person moving from bench to bench, the size of the bounding box will not change. However, if a person has left another item behind, the item left behind should have a smaller bounding box area after the person has left the scene, as the person bounding box is usually much larger than the abandoned object (bag) bounding box. Accordingly, analysis of video frame data at 106 that finds a large bounding box with a lot of motion in one video frame, followed by a much smaller bounding box with no motion in a subsequent frame, may result in a larger abandonment value assignment to associated alert relative to another alert wherein the extracted motion features do not manifest such an observation. Thus, in one aspect, the abandonment attribute value assigned to the object is a value in proportion to a determined amount of a difference in motion activity of the bounding box, and of a determined amount of change in size of the bounding box.

Thresholds may also be specified and applied to any of the processes at 106, 108 or 110. For example, thresholds may be used to distinguish between large and small amounts of differences in motion activity before and after commencement of a period of static motion values associated with the object, or amounts of change in the size of a bounding box associated with the object relative to the commencement of the period of static motion values, in order to assign the abandonment attribute value (for example, large enough amounts indicate a large abandonment value, else small amounts indicate a smaller abandonment value).

In the present example, the mini-tracker uses historical size and location data of an object blob at 106 and 110 to differentiate object labels and relevance values via blob association with bi-partite matching. More particularly, the mini tracker keeps track over time of a tracklet defined by the start (i) and end (s) locations (L) of a static object blob, and the sizes of its associated bounding box (R), which may be indicated by $(L_s;R_s)$ and $(L_i;R_i)$, respectively.

For the abandonment analysis at 106, the mini-tracker searches for another blob $(R_a)$ that maximally overlaps with the object blob right before the object gets tracked by the mini-tracker $(R_i)$. For a static object the occluding object blob region $(R_a)$ should be associated with a larger external motion from the owner. The mini-tracker accordingly extracts or determines the following features relevant to abandonment rankings:

(i) a time duration from the start of a tracklet and a time of the tracklet being static;
(ii) a distance between $(R_i)$ and $(R_s)$, in effect $\|L_i-L_s\|$;
(iii) a total length of the tracklet;
(iv) a ratio of the area [A(.)] of the static region over that of the start region, in effect $[\max A((R_s)/A(R_i), A(R_i)/A(R_s))]$;
(v) a ratio of the height (h) of the static blob over that of the start blob, in effect $[\max(h_{Rs}/h_{Ri}; h_{Ri}/h_{Rs})]$; and
(vi) area and height ratio determinations as described at (iv) and (v) with respect to blob regions $(R_a)$ and $(R_i)$ if an occluding object blob $(R_a)$ exists;

For the staticness analysis at 110 the mini-tracker extracts or determines the following features that are relevant to staticness:

(vii) an average movement of the blob $(R_i)$ over time since it's tracking by the FSM in the BGS model;
(viii) a maximum movement of the blob $(R_i)$;
(ix) a total residence time of $(R_i)$ in the FSM;
(x) a percentage of video frames below a good matching threshold; and
(xi) a percentage of video frames above a good matching threshold.

The FSM starts to track an object if the object remains static for more than a threshold period (for example, one second, though other thresholds may be practiced). The level of matching between an object $(R_i)$ and its origin $(O_i)$ are measured using area matching for efficiency according to (1):

$$r = R_i \cap O_i / R_i \cup O_i \qquad (1)$$

In one example, a matching is considered good and results in a high staticness valuation if the value of (r) is greater than or equal to 0.85, though other value thresholds may be specified.

Foregroundness attribute values quantify an amount of separation of the foreground image data from the background model of the image. Generally, the bounding box of a true abandoned object should have a higher relative level of separation of foreground image bounding box data from a background model relative to a level of separation of the bounding box of a shadow or glare artifact created by shadows or lighting changes. Edge and texture-based measures that are invariant or robust to illumination changes are used to extract feature data at 104, and to determine foregroundness valuations at 108.

Some aspects of the present invention learn and apply the relationships of Table 1 to determine the relative strengths of one or more of the abandonment attribute values at 106, the foregroundness attribute values at 108 and the staticness attribute values at 110 by modeling relative attributes using a Support Vector Machine (SVM) ranking formulation that incorporates known similarities between pairs of points to generate relative orderings. Rather than assign a binary (yes or no, high or low) value of abandonment, foregroundness and staticness attributes, these aspects determine a relative attribute value that indicates the strength of an attribute in an image with respect to other images. The extracted features are compared to other images and assigned a "more likely" or higher, or "less likely" or lower attribute values as a function of comparing the features to those extracted for others of the images. In contrast to binary value determinations, relative attribute determinations allow access to more detailed human supervision (and thereby potentially higher recognition accuracy), as well as the ability to generate more informative descriptions of novel images.

Some aspects of the present invention determine high-level attribute ranking values at 106, 108 or 110 through extensions of SVM techniques taught in "Relative Attributes," Grauman and Parikh, Proceedings of the IEEE International Conference on Computer Vision (ICCV), 2011 (hereinafter sometimes referred to as "Grauman et al"). For a set of training images [I={i}] represented in [$\mathbb{R}^n$], given a set of feature-vectors data points [$x_i$] in [$\mathbb{R}^n$] with known pairwise rank orderings and similarities between some pairs of points in terms of a set of attributes [$a \in A$], a ranking function [$f_a$] is defined as a linear combination parameterized by a weight vector [$w_a$] according to formulation (2):

$$f_a(x) = w_a^T x, \quad a \in A \qquad (2)$$

The weight vector [$w_a$] for a particular attribute [a] is learnt by optimizing an SVM-like objective function. More particularly, if [$(i>j) \in O_a$] represents known pairwise rankings between points with respect to attribute [a], and similarly [$(k \approx l) \in S_a$] represents known pairwise similarities on the same attribute, the optimum weight vector [$w_a$] may be obtained by minimizing the following objective function expression (3):

$$w^*_a = \mathrm{argmin}_{w_a}(\tfrac{1}{2} w_a^T w_a + C(\Sigma_{(i,j) \in O_a} \epsilon_{ij}^2 + \Sigma_{(k,l) \in S_a} \gamma_{lk}^2)); \qquad (3)$$

Which is subject to:

$$\epsilon_{ij} = \max(0, 1 - (x_i - x_j)^T w_a); \qquad (4)$$

$$\gamma_{kl} = |(x_k - x_l)^T w_a|; \qquad (5) \text{ and}$$

$$[\epsilon_{ij} \geq 0] \text{ and } [\epsilon_{ij} \geq 0]. \qquad (6)$$

In the above expressions, [$\epsilon_{ij}$] and [$\gamma_{ij}$] denote slack variables that penalize wrong rank orderings and dissimilarities, respectively, between the labeled pairs in the training data set. The coefficient [C] emphasizes the ordering and similarity errors relative to the margin. It is noted that the margin here refers to the difference between the two nearest ranking scores among all pairs of known rankings in the training data. The above objective function is convex and may be optimized using Newton's method with a line search for the optimum step size.

Thus, each of the processes 106, 108 and 110 of FIG. 1 independently convert low-level, extracted image features into different respective normalized high-level rankings that are each relevant to determining the validity of the alerts. However, these high-level rankings are limited in usefulness when considered alone in ranking images with respect to an overall quality of relevance or suspiciousness with respect to whether a given object alert is a true abandoned object alert. For example, while true abandoned objects should have high foregroundness or staticness values, considering each of these values alone or in combination with each other will not lower the rankings of false positives, since many types of non-abandoned objects (for example, people, bags in proximity to people (and thus not abandoned), temporary signs, benches and other permanent seating and structural elements and installations, etc.) can also have high levels of separation from the background model, or may be highly static in the case of inanimate objects within these examples, yet none of the objects are truly abandoned objects.

Accordingly, each of these first, high-level abandonment, foregroundness and staticness attribute strengths determined for the alert object at 106, 108 and 110, respectively, are fed as inputs into a second level ranker at 112 that prioritizes the alert according to a learned importance or relevance value generated from the relative abandonment, foregroundness and staticness strengths, and optionally as a function of a user-defined assessment policy. The second level ranker uses these values to generate a second-level priority value of the alert, in some aspects according to (as a function of) a user-defined assessment policy. The value generated at 112 is useful for prioritizing or ordering the object alert relative to other alerts in adjudicating the alert at 114 as a function of their relative importance or relevance to an abandoned object determination triggered by each of said alerts at 102.

At 114 the alert is adjudicated as a function of the second-level priority value assigned to the alert at 112. Adjudication at 114 may include adjudicating a plurality of alerts in order of their prioritized, second-level rankings, with more likely true or otherwise higher ranked events adjudicated progressively before lesser ranked events, with the progressively lesser ranked events adjudicated only as resources permit. In some aspects, adjudication at 114 includes only considering those alerts that have a second-level priority value assigned at 112 that meet a threshold second-level importance or relevance value.

Figure 3:
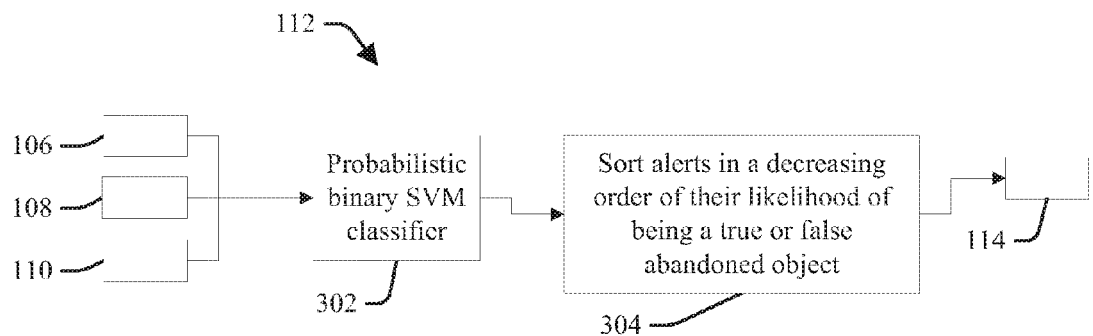
FIG. 3 is a block diagram illustration of a second-level method or process for prioritizing abandoned object detection alerts as a function of relative visual attribute values according to the present invention.

FIG. 3 illustrates one aspect of the present invention wherein the second level ranker at 112 includes a probabilistic binary SVM classifier 302 that generates a probabilistic output from the abandonment, foregroundness and staticness attribute strengths or ranking scores determined at 106, 108 and 110, respectively. Aspects of the present invention may generate the probabilistic output at 302 by applying an SVM classifier learned in generating the first level rankings at 106, 108 and 110, for example applying the relationships described above in Table 1. The probabilistic output is used to sort the alerts at 304 based on their respective attribute scores at 106, 108 and 110 in a decreasing order of their likelihood of being a true abandoned object, such as a bag and thus as within the group of true images, or as being within the false group, which is used in adjudicating the alert (at 114, FIG. 2). The approach of FIG. 3 can separate true alerts from false alarms with a high degree of accuracy. However, it lacks an ability to further differentiate between different types of false alarms, in one aspect due to having been trained on binary class labels.

Figure 4:
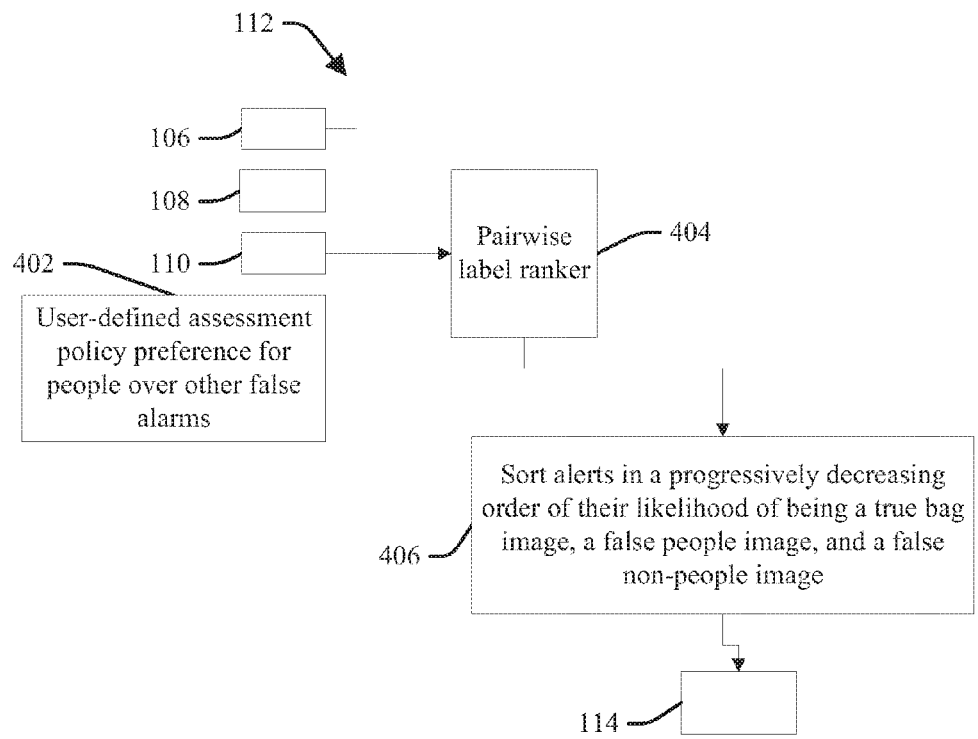
FIG. 4 is a block diagram illustration of another second-level method or process for prioritizing abandoned object detection alerts as a function of relative visual attribute values according to the present invention.

FIG. 4 illustrates another aspect of the second level ranker 112 that includes pair-wise ranker 404 that prioritizes or sorts alerts in a relative order of importance or relevance as a function of the first, high-level abandonment, foregroundness and staticness attribute strengths determined at 106, 108 and 110, in view of a human knowledge or policy input 402. At 406 the second level 112 uses human rules or knowledge reflected in the policy preference input 402 to apply a general ranking algorithm to determine a score for each alert and then sort the alerts at 406 in descending order of relevance. The pair-wise ranker 404 is built using the approaches described above with respect to FIG. 1, but using an alert importance indication from the user-defined assessment preference 402 as another attribute input to generate a relative importance or relevant ordering of the alerts that further distinguishes some of the false alerts and ranks them higher than others.

In one aspect, the alert importance indication 402 implements the policy or rule illustrated in Table 1 that ranks bags (B+) over people (P−), and people (P−) over each of the other false objects (lighting changes (L), shadows (S) and ghosts (G). Once such a ranking function is learned, the second level ranker 404 can compute a score for any new alert indicating its relevance relative to the other alerts. Even though the alert type is unknown, the second-level ranker 404 may assign every new alert a score indicting its relevance so long as the type of the alerts in the training data is known. By enforcing an ordering of the alerts based on adjudication preferences (for example, B+>P-> others) during training, the ranker 404 is enabled to rank people alerts higher than shadows and lighting-related artifacts, without knowing their types.

In the present example, ranking people over the other false objects is a function of a user-defined assessment policy 402 that recognizes that false alarms related to people objects are more relevant or important than the other false alarm objects. More particularly, with respect to abandoned object detection, it may be determined by a user that that investigating irrelevant alerts caused by shadows (S–) and lighting artifacts (L–) leads to wasteful utilization of time and effort by an investigating employee or security officer. While alerts raised by activities of people (P–) in the scene are also less interesting than truly static objects such as bags (B+), investigating alerts generated by people may sometimes be useful in detecting the occurrence of an abandonment of another object. This knowledge or policy 402 suggests a relative ordering of alerts themselves based on their relevance to the end user, and in this example the process at 404 treats the relevance as an attribute of the alerts to be used in learning overall second-level ranking scores for the alerts.

It will be appreciated that other policies or rules implemented by the ranker 404 may have other results. For example, a user may specify a policy input 402 to rank ghost artifacts ahead of the other false objects, or to prefer people first, then shadows, then ghosts, etc., which would revise values assigned and used to sort the alerts at 406 as described above. Therefore, aspects of the present invention will not be limited by the illustrative but not exhaustive examples described herein.

Thus, aspects of the present invention provide a learning framework that combines multiple semantically meaningful attributes to determine an overall priority of the alerts. Alerts may be prioritized in order of their relative true or false labels, and further as a function of normalized probabilistic value rankings, from most suspicious (highest value) object with a "true" label or within a true grouping, to least suspicious (lowest value) within a false grouping. Thereby, the most suspicious alerts may be analyzed (for example, by a human monitor, or by some other, automated process) before each of lower ranked alerts, either through considering prioritized batches of alerts or by progressively working through the alerts in order of their rankings.

Such suspiciousness rankings and labels indicate which images should have priority attention at 114, in an order of importance. While each alert may still get attention, the lower-rated alert images may be pushed to the bottom. Prioritizing adjudication of alerts at 114 may provide a continuum ranking, or prioritized groupings may be formed based on meeting one or more thresholds that indicate batches of most important, semi-important, and low or least important images.

By transforming low-level features into higher-level ranking domains, the resultant classifications and priorities are expected to be more robust and meaningful over prior art techniques. Aspects of the present invention may avoid missing true events when not all alerts are adjudicated by ranking the most likely true events higher than false positive events. For example, if 1,000 alerts include only ten true events, and if only the top 100 of the 1,000 possible alerts may be sufficiently analyzed in a timely manner (due to manpower, time or other resource limitations), if the process at 112 determines that the ten true events have probabilistic ranking values within the top 100 of the possible 1,000 values, then all of the true events will be analyzed if the top-ranked 100 events are adjudicated or otherwise analyzed at 114.

In one example, a bounding box of a first object associated with a first alert receives a low abandonment value 0.10 at 106; a low foregroundness value of 0.10 at 108, and a high staticness value of 0.95 at 110 (since it is stable with no change with respect to the background model). Although the high staticness value by itself is consistent with a true bag drop event, the low abandonment and foregroundness values indicate as a function of the pair-wise relationships reflected in Table 1 at 406 and 408 that this image is neither a true bag nor a person. The relative values instead result in this first object being labeled as within the false group at 406, and at 408 further as a shadow (S–) that is ranked below both true bag and person-labeled objects in an order relative to other artifact-labeled objects as a function of an overall suspiciousness ranking of 0.05.

In contrast, the bounding box of a second object associated with a second alert has high values for each of the three feature rankings: an abandonment value of 0.95, a foregroundness value of 0.95 and a staticness value of 0.98, resulting in a labeling of this second object as a true bag (B+) at 112, and a ranking order at 114 relative to the other true bags as a function of an overall suspiciousness ranking of 0.99.

In a third example, a bounding box has a middle abandonment value of 0.5, reflecting that there is some movement and change in the bounding box prior to assuming its static nature, but not as great as that which is observed with an abandoned bag. The foreground value for the third object is high (0.95). Its staticness is also high (0.80), although not as high as the values of the first or second object bounding boxes: it is slightly lower due to the slight movements that are typically inherent with a person sitting or standing. Accordingly, the third object is labeled as a person (P–) at 112, and ranked at 114 behind all other objects labeled as true bags, ahead of all other objects labeled as artifacts, and relative to other objects labeled as persons as a function of an overall suspiciousness ranking of 0.40.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic or optical forms or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
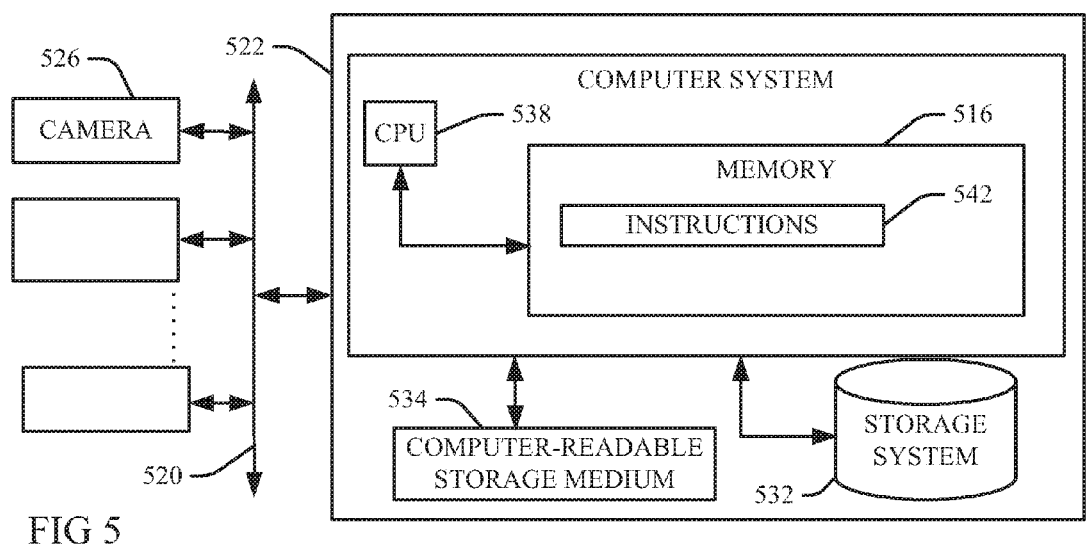
FIG. 5 is a block diagram illustration of a computer system implementation of an aspect of the present invention.

Referring now to FIG. 5, an exemplary computerized implementation of an aspect of the present invention includes a computer system or other programmable device 522 in communication with a plurality of video image data providers 526 (cameras, storage devices including archived video data, etc.) that prioritizes abandoned object detection alerts as described above with respect to FIGS. 1 through 4. Instructions 542 reside within computer readable code in a computer readable memory 516, or in a computer readable storage system 532, or other tangible computer readable storage medium 534 that is accessed through a computer network infrastructure 520 by a Central Processing Unit (CPU) 538. Thus, the instructions, when implemented by the processing unit 538, cause the processing unit 538 to automatically prioritize the adjudication of object alerts as a function of relative visual attribute values as described above with respect to FIGS. 1 through 4.

In one aspect, the present invention may also perform process steps of the invention on a subscription, advertising, and/or fee basis. That is, a service provider could offer to integrate computer-readable program code into the computer system 522 to enable the computer system 522 to prioritize abandoned object detection alerts in order of relative suspiciousness as described above with respect to FIGS. 1 through 5. The service provider can create, maintain, and support, etc., a computer infrastructure, such as the computer system 522, network environment 520, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may include one or more of: (1) installing program code on a computing device, such as the computer device 522, from a tangible computer-readable medium device 532 or 534; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The aspect was chosen and described in order to best explain the principles of the invention and the practical application, and to enable others of ordinary skill in the art to understand the invention for various embodiments with various modifications as are suited to the particular use contemplated.

The flowchart and block diagrams in the figures illustrate the architecture, functionality, and operation of possible implementations of systems, methods and computer program products according to various aspects of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for prioritizing the adjudication of object alerts as a function of relative visual attribute values, the method comprising executing on a computer processing unit the steps of:
   ranking relative strengths of each of a plurality of attributes of image features of an object that is static within an image scene of a video data input, wherein the image features are extracted from the video data input over a tracking time period, and wherein the plurality of attributes comprises a foregroundness attribute and a staticness attribute;
   identifying the detected object as one of a bag object, a people object and a visual artifact, as a function of the ranked relative strengths of the plurality of extracted feature attributes, wherein the bag object, the people object and the visual artifact are each associated with different combinations of values of the ranked relative strengths of the plurality of extracted feature attributes; and
   prioritizing the alert relative to other alerts by ranking alerts generated from detected bag objects over alerts generated from detected people objects, and alerts generated from detected people object over alerts generated from detected visual artifacts.

2. The method of claim 1, further comprising:
   integrating computer-readable program code into a computer system comprising the processing unit, a computer readable memory and a computer readable tangible storage medium;
   wherein the computer readable program code is embodied on the computer readable tangible storage medium and comprises instructions for execution by the processing unit via the computer readable memory that cause the processing unit to rank the relative strengths of each of the plurality of attributes of image features, identify the detected object as the one of the bag object, the people object and the visual artifact as the function of the ranked relative strengths of the plurality of extracted feature attributes, and prioritize the alert relative to other alerts.

3. The method of claim 1, wherein the plurality of attributes further comprises an abandonment attribute that indicates a level of likelihood of abandonment of the object.

4. The method of claim 3, further comprising:
   identifying the detected object as one of the bag object, the people object and the visual artifact as the function of the learned and ranked relative strengths of the plurality of extracted feature attributes by using a probabilistic binary support vector machine classifier that generates a probabilistic output from the abandonment, foregroundness and staticness attribute strengths.

5. The method of claim 3, wherein the detected visual artifact is identified as one of a detected lighting change artifact, a detected shadow artifact and a detected ghost artifact, as a function of different combinations of values of the ranked relative strengths of the plurality of extracted feature attributes that are each associated with the lighting change artifact, the detected shadow artifact and the detected ghost artifact.

6. The method of claim 3, further comprising:
   sorting the alerts by assigning a highest ranking value to an alert in response to determining that each of the abandonment attribute value, the foregroundness attribute value and the staticness attribute value of the alert are highest values of their respective attribute values.

7. The method of claim 3, wherein the foregroundness attribute quantifies a level of separation of foreground image data of the object from a background model of the image scene; and
   wherein the staticness attribute quantifies a level of stability of dimensions of a bounding box of the object over time.

8. The method of claim 7, wherein the image features extracted from the video data input over the tracking time period are low-level image features that are relevant to the object over the tracking time period and comprise two or more of:
   an amount of a change in size over time of a bounding box defining a foreground object blob distinguished from a background model of the image data and identified as a possible abandoned object;
   an optical flow feature comprising motion flow data that is variable over time and associated with movement of the foreground object blob within its bounding box dimensions; and
   a border contrast feature that is relevant to visually distinguishing the foreground blob from the background model, wherein the border contrast feature comprises sharpness, definition, or granularity attributes.

9. The method of claim 8, further comprising determining the abandonment attribute value by:
   determining an amount of difference in motion activity before and after commencement of a period of static motion values associated with the object;
   determining an amount of change in a size of the bounding box relative to a commencement of the period of static motion values; and assigning the abandonment attribute value in proportion to the determined amount of difference in motion activity and the determined amount of change in the size of the bounding box.

10. The method of claim 9, further comprising:
extracting low-level image features from the video data input that are relevant to the object over the time period by tracking movement of a location of the bounding box over the time period, and a size of the bounding box over the time period; and
determining the abandonment attribute value from the extracted features by:
searching for another blob bounding box that overlaps with the bounding box at a point in time before a beginning of the tracking time period; and
determining a location distance between the bounding box and the another bounding box over the tracking time period in response to the searching finding the another bounding box that overlaps with the blob bounding box at the point in time before the beginning of the tracking time period.

11. The method of claim 10, further comprising determining the value of the abandonment attribute of the object from the extracted features as a function of:
determining a first ratio of an area value of the bounding box at the beginning of the tracking time period relative to an area value of the bounding box at an end of the tracking time period;
determining a second ratio of a height value of the bounding box at the beginning of the tracking time period relative to a height value of the bounding box at the end of the tracking time period;
determining a third ratio of the area value of the bounding box relative to an area value of the another bounding box over the tracking time period; and
determining a fourth ratio of the height value of the bounding box relative to a height value of the another bounding box over the tracking time period.

12. The method of claim 11, further comprising determining the staticness attribute value of the object by:
determining an average amount of movement of the bounding box over the tracking time period via a finite state machine;
determining a maximum amount of movement of the bounding box over the tracking time period via the finite state machine;
determining the staticness attribute value as a function of a ratio of a match of an amount of movement of the bounding box at the beginning of the tracking time period to at least one the determined average amount and the determined maximum amount of movement of the bounding box over the tracking time period.

13. A system, comprising:
a processing unit;
a computer readable memory in communication with the processing unit; and
a computer-readable storage medium in communication with the processing unit;
wherein the processing unit executes program instructions stored on the computer-readable storage medium via the computer readable memory and, thereby:
ranks relative strengths of each of a plurality of attributes of image features of an object that is static within an image scene of a video data input, wherein the image features are extracted from the video data input over a tracking time period, and wherein the plurality of attributes comprises a foregroundness attribute and a staticness attribute;
identifies the detected object as one of a bag object, a people object and a visual artifact, as a function of the ranked relative strengths of the plurality of extracted feature attributes, wherein the bag object, the people object and the visual artifact are each associated with different combinations of values of the ranked relative strengths of the plurality of extracted feature attributes; and
prioritizes the alert relative to other alerts by ranking alerts generated from detected bag objects over alerts generated from detected people objects, and alerts generated from detected people object over alerts generated from detected visual artifacts.

14. The system of claim 13, wherein the plurality of attributes further comprises an abandonment attribute that indicates a level of likelihood of abandonment of the object.

15. The system of claim 14, wherein the processing unit executes program instructions stored on the computer-readable storage medium via the computer readable memory and thereby identifies the detected object as one of the bag object, the people object and the visual artifact as the function of the learned and ranked relative strengths of the plurality of extracted feature attributes by using a probabilistic binary support vector machine classifier that generates a probabilistic output from the abandonment, foregroundness and staticness attribute strengths.

16. The system of claim 14, wherein the processing unit executes the program instructions stored on the computer-readable storage medium via the computer readable memory and thereby identifies the detected visual artifact as one of a detected lighting change artifact, a detected shadow artifact and a detected ghost artifact, as a function of different combinations of values of the learned and ranked relative strengths of the plurality of extracted feature attributes that are each associated with the lighting change artifact, the detected shadow artifact and the detected ghost artifact.

17. A computer program product for automatically prioritizing the adjudication of object alerts as a function of relative visual attribute values, the computer program product comprising:
a computer readable hardware storage device having computer readable program code embodied therewith, wherein the computer readable storage medium is not a transitory signal per se, the computer readable program code comprising instructions for execution by a computer processing unit that cause the computer processing unit to:
rank relative strengths of each of a plurality of attributes of image features of an object that is static within an image scene of a video data input, wherein the image features are extracted from the video data input over a tracking time period, and wherein the plurality of attributes comprises a foregroundness attribute and a staticness attribute;
identify the detected object as one of a bag object, a people object and a visual artifact, as a function of the ranked relative strengths of the plurality of extracted feature attributes, wherein the bag object, the people object and the visual artifact are each associated with different combinations of values of the ranked relative strengths of the plurality of extracted feature attributes; and
prioritize the alert relative to other alerts by ranking alerts generated from detected bag objects over alerts generated from detected people objects, and alerts generated from detected people object over alerts generated from detected visual artifacts.

18. The computer program product of claim 17, wherein the foregroundness attribute quantifies a level of separation of foreground image data of the object from a background model of the image scene;
   wherein the staticness attribute quantifies a level of stability of dimensions of a bounding box of the object over time; and
   wherein the plurality of attributes further comprises an abandonment attribute that indicates a level of likelihood of abandonment of the object.

19. The computer program product of claim 18, wherein the computer readable program code instructions for execution by the computer processing unit further cause the computer processing unit to identify the detected object as one of the bag object, the people object and the visual artifact as the function of the learned and ranked relative strengths of the plurality of extracted feature attributes by using a probabilistic binary support vector machine classifier that generates a probabilistic output from the abandonment, foregroundness and staticness attribute strengths.

20. The computer program product of claim 18, wherein the computer readable program code instructions for execution by the computer processing unit further cause the computer processing unit to identify the detected visual artifact as one of a detected lighting change artifact, a detected shadow artifact and a detected ghost artifact, as a function of different combinations of values of the learned and ranked relative strengths of the plurality of extracted feature attributes that are each associated with the lighting change artifact, the detected shadow artifact and the detected ghost artifact.

* * * * *